(12) United States Patent
Chatterjee et al.

(10) Patent No.: US 11,336,414 B2
(45) Date of Patent: *May 17, 2022

(54) DOWNLINK HYBRID AUTOMATIC REPEAT REQUEST FEEDBACK FOR NARROWBAND INTERNET OF THINGS DEVICES

(71) Applicant: Apple Inc., Cupertino, CA (US)

(72) Inventors: Debdeep Chatterjee, San Jose, CA (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/865,690

(22) Filed: May 4, 2020

(65) Prior Publication Data

US 2021/0021393 A1   Jan. 21, 2021

Related U.S. Application Data

(63) Continuation of application No. 16/060,916, filed as application No. PCT/US2016/054253 on Sep. 28, 2016, now Pat. No. 10,644,856.

(Continued)

(51) Int. Cl.
*H04L 5/00* (2006.01)
*H04W 4/70* (2018.01)
(Continued)

(52) U.S. Cl.
CPC .......... *H04L 5/0051* (2013.01); *H04L 1/1812* (2013.01); *H04L 1/1854* (2013.01);
(Continued)

(58) Field of Classification Search
CPC ... H04L 5/0051; H04L 1/1864; H04L 5/0055; H04L 1/1861; H04L 1/1854;
(Continued)

(56) References Cited

U.S. PATENT DOCUMENTS

2011/0268080 A1   11/2011   Luo et al.
2013/0230030 A1   9/2013    Papasakellariou et al.
(Continued)

OTHER PUBLICATIONS

2. Ericsson, "HARQ principles for NB-IoT", 3GPP TSG RAN WG2 92, R2-156137, Anaheim, USA, Nov. 16-20, 2015. Fig. 1, Section 2.

(Continued)

*Primary Examiner* — Kiet Tang
(74) *Attorney, Agent, or Firm* — Eschweiler & Potashnik, LLC

(57) ABSTRACT

Techniques for transmitting hybrid automatic repeat request (HARQ) feedback by narrowband Internet-of-Things (NB-IoT) devices are provided. NB-IoT user equipment (UE) can transmit HARQ feedback in response to a narrowband physical downlink shared channel (NPDSCH) received over a downlink (DL). NB-IoT UEs can transmit the responsive HARQ feedback over a narrowband physical uplink shared channel (NPUSCH) or a narrowband physical uplink control channel (NPUCCH). Options for defining the physical structures of the NPUCCH and NPUSCH and user multiplexing on the uplink (UL) are provided. Determination of an UL resource allocation by determining resources in time, frequency, and the code domain for the HARQ feedback transmissions are also provided. Higher level signaling and/or indications provided in downlink control information (DCI) can be used to determine the time, frequency, or code domain resources.

21 Claims, 10 Drawing Sheets

Related U.S. Application Data

(60) Provisional application No. 62/308,602, filed on Mar. 15, 2016, provisional application No. 62/276,534, filed on Jan. 8, 2016.

(51) Int. Cl.
 *H04L 1/18* (2006.01)
 *H04W 84/04* (2009.01)

(52) U.S. Cl.
 CPC .......... *H04L 1/1858* (2013.01); *H04L 1/1861* (2013.01); *H04L 1/1864* (2013.01); *H04L 5/0055* (2013.01); *H04L 5/0091* (2013.01); *H04W 4/70* (2018.02); *H04L 5/0007* (2013.01); *H04W 84/042* (2013.01)

(58) Field of Classification Search
 CPC ... H04L 1/1812; H04L 1/1858; H04L 5/0048; H04L 1/18; H04W 4/70; H04W 84/042; H04W 72/0413; H04W 72/042
 See application file for complete search history.

(56) References Cited

U.S. PATENT DOCUMENTS

| | | | | |
|---|---|---|---|---|
| 2015/0043397 | A1* | 2/2015 | Hsieh | H04L 1/1854 370/280 |
| 2015/0326354 | A1* | 11/2015 | Li | H04W 52/262 370/329 |
| 2016/0029365 | A1* | 1/2016 | Papasakellariou | H04W 72/0413 370/329 |
| 2017/0317808 | A1* | 11/2017 | You | H04L 5/0055 |
| 2018/0145802 | A1* | 5/2018 | Hwang | H04W 72/0453 |
| 2018/0287845 | A1* | 10/2018 | Kim | H04W 72/042 |

OTHER PUBLICATIONS

3GPP TS 36.211; 211 V13.0.0 (Dec. 2015); Technical Specification; 3rd Generation Partnership Project; Technical Specification Group Radio Access Network; Evolved Universal Terrestrial Radio Access (E-UTRA); Physical channels and modulation; (Release 13); Dec. 2015; p. 2-141.

3GPP TS 36.212 V13.0.0; 3rd Generation Partnership Project; Technical Specification Group Radio Access Network; Evolved Universal Terrestrial Radio Access (E-UTRA; Multiplexing and channel coding; (Release 13) Dec. 2015; p. 2-121.

3GPP TS 36.213 V12.8.0; UE procedures related to Sidelink: Dec. 2015; p. 300-318.

3GPP TS 36.300 V11.14.0; 3rd Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2; (Release 11); Dec. 2015; p. 2-210.

3GPP TS 36.331 V13.0.0; 3rd Generation Partnership Project; Technical Specification Group Radio Access Network; Evolved Universal Terrestrial Radio Access (E-UTRA); Radio Resource Control (RRC); Protocol specification; (Release 13); Dec. 2015; p. 2-507.

* cited by examiner

DOWNLINK HYBRID AUTOMATIC REPEAT REQUEST FEEDBACK FOR NARROWBAND INTERNET OF THINGS DEVICES

RELATED CASE

This application is a continuation of U.S. patent application Ser. No. 16/060,916 filed Jun. 8, 2018, which claims priority to International Application PCT/US2016/054253 filed Sep. 28, 2016, which claims priority to U.S. Provisional Patent Application No. 62/276,534, filed Jan. 8, 2016, and U.S. Provisional Patent Application No. 62/308,602, filed Mar. 15, 2016, the entirety of which are hereby incorporated by reference.

TECHNICAL FIELD

Embodiments herein generally relate to communications between devices in narrowband wireless communications networks.

BACKGROUND

The Third Generation Partnership Project (3GPP) introduced a narrowband Internet-of-Things (NB-IoT) design into its Release 13 specifications of the Long-Term Evolution (LTE) wireless mobile communications standard. For NB-IoT, due to bandwidth limitations of 180 kHz, legacy LTE techniques for hybrid automatic repeat request (HARQ) feedback may not be suitable. Accordingly, new techniques for implementing HARQ feedback for NB-IoT may be needed.

DETAILED DESCRIPTION

Figure 1:
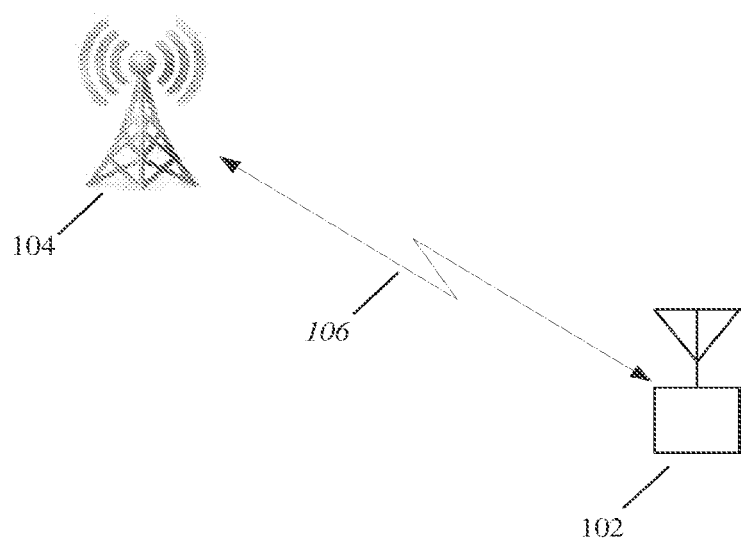
FIG. 1 illustrates an exemplary operating environment.

Various embodiments may be generally directed to techniques for transmitting hybrid automatic repeat request (HARQ) feedback by narrowband Internet-of-Things (NB-IoT) devices. NB-IoT user equipment (UE) can transmit HARQ feedback in response to a narrowband physical downlink shared channel (NPDSCH or NB-PDSCH) received over a downlink (DL). NB-IoT UEs can transmit the responsive HARQ feedback over a narrowband physical uplink shared channel (NPUSCH or NB-PUSCH) or a narrowband physical uplink control channel (NPUCCH or NB-PUCCH). Various embodiments include options for defining the physical structures of the NPUCCH and NPUSCH and user multiplexing on the uplink (UL). Various embodiments further include determining an UL resource allocation by determining resources in time, frequency, and the code domain for the HARQ feedback transmissions. Determinations can be made based on higher level signaling and/or indications provided in downlink control information (DCI). Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants—including 4G and 5G wireless networks.

Various embodiments may involve transmissions over one or more wireless connections according to one or more narrowband Internet-of-Things (NB-IoT) technologies and/or standards such as, for example, the 3GPP NB-IoT design introduced into the Release 13 specifications of the LTE wireless mobile communications standard. The 3GPP LTE NB-IoT specifications define a Radio Access Technology (RAT) for a cellular Internet-of-Things (CIoT) based on a non-backward-compatible variant of the evolved Universal Mobile Telecommunications System (UMTS) Terrestrial Radio Access (E-UTRA) standard specifically tailored towards improved indoor coverage, support for a massive number of low throughput devices, low delay sensitivity, ultra-low device complexity and cost, low device power consumption, and optimized network architecture.

Various embodiments may additionally or alternatively involve transmissions according to one or more Global System for Mobile Communications (GSM)/Enhanced Data Rates for GSM Evolution (EDGE). Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an exemplary operating environment 100 such as may be representative of some embodiments in which techniques for transmitting hybrid automatic repeat request (HARQ) feedback by narrowband Internet-of-Things (NB-IoT) devices are implemented. The operating environment 100 can include a mobile device 102 and a cellular base station 104. The mobile device 102 can communicate with the base station 104 over a wireless communications interface 106. The mobile device 102 can be any mobile computing device capable of communicating wirelessly with one or more wireless communication networks. As an example, the mobile device 102 can be an IoT device capable of communicating wirelessly over a relatively narrowband range of frequencies with the cellular base station 104. The mobile device 102 can be a user equipment (UE). The base station 104 can be a cellular base station such as, for example, an evolved node B (eNB). The wireless communications interface 106 can be, for example, a wireless interface for any of the wireless networks or standards described herein including, for example, a 4G, LTE, or 5G wireless network, or, in particular, an NB-IoT technology and/or standard. As an example, the mobile device 102 can be a smart meter that can be connected to or incorporated into a larger device for communicating information about the associated device (and therefore can be intended to be immobile or fixed to the larger device). The mobile device 102 and the base station 104 can implement the HARQ feedback techniques described herein.

The operating environment 100 can represent an NB-IoT system designed to support low complexity devices (e.g., the mobile device 102) that support 180 kHz UE radio frequency (RF) bandwidth for both downlink (DL) and uplink (UL), in three different modes of operation—stand-alone deployment, NB-IoT deployment in the guard band of an LTE carrier, and NB-IoT deployed in-band. A NB-IoT carrier can generally comprise one legacy LTE Physical Resource Block (PRB) for in-band mode and its equivalent in stand-alone/guard-band modes, corresponding to a system bandwidth of 180 kHz. For UL transmissions, multi-tone transmissions using SC-FDMA with 15 kHz subcarrier spacing and single-tone transmissions with cyclic prefix (CP) insertion and sine pulse shaping in the frequency domain (e.g., without any DFT precoding) with both 15 kHz and 3.75 kHz subcarrier spacing can be supported.

In LTE, UL data and UL control information (UCI) including hybrid automatic repeat request (HARQ)-Acknowledgement (ACK)/Non-Acknowledgement (NACK) feedback (also referred to as ACK/NACK feedback or HARQ-ACK feedback) in response to DL Physical Downlink Shared Channel (PDSCH) reception are transmitted using the Physical Uplink Shared Channel (PUSCH) and Physical Uplink Control Channel (PUCCH) respectively, while under some conditions, certain UCI contents may also be transmitted using the PUSCH.

Also, in LTE, the minimum number of subcarriers used for PUSCH/PUCCH transmissions is twelve corresponding to the number of subcarriers in a single physical resource block (PRB). To support better UE multiplexing and also help support of UEs in extreme coverage class (with up to 164 dB maximum coupling loss (MCL)) using higher transmission power spectral density (PSD), UL transmissions using less than 12 subcarriers are to be supported for NB-IoT.

For NB-IoT, due to the bandwidth limitation of 180 kHz, legacy PUCCH design may not be applicable and new mechanisms to transmit the HARQ-ACK feedback may be specified. Similar to LTE, UL data can be transmitted using an UL shared channel called Narrowband-PUSCH (NPUSCH or NB-PUSCH) and at least HARQ-ACK feedback in response to DL transmissions on Narrowband-PDSCH (NPDSCH or NB-PDSCH) can be transmitted on Narrowband-PUCCH (NPUCCH or NB-PUCCH). Another alternative could be to transmit the HARQ-ACK feedback using the NPUSCH itself instead of defining a new NPUCCH. In this ease, although the HARQ-ACK feedback is transmitted using NPUSCH, only the physical structure of NPUSCH may be used while the procedure to transmit the HARQ-ACK feedback, including determination of the time-frequency resources to transmit the HARQ-ACK feedback, can be different from that for NPUSCH transmissions carrying UL data.

Accordingly, in various embodiments, techniques for the transmission of HARQ-ACK feedback by NB-IoT mobile devices and/or UEs (such as the mobile device 102) in response to NPDSCH transmitted in the DL are provided.

In various embodiments, the DL HARQ-ACK feedback can be transmitted using the NPUSCH physical structure. Further, in various embodiments, DL HARQ-ACK feedback can be transmitted using the NPUSCH physical structure when an UL transmission is scheduled. When there is no UL shared channel (UL-SCH) transmission to be scheduled for the NB-IoT UE 102, transmission of an UL grant via the DCI carried by the Narrowband Physical Downlink Control Channel (NPDCCH or NB-PDCCH) to indicate the UE 102 to transmit HARQ-ACK information using NPUSCH structure may be needed. This approach can be quite inefficient as the loading on the Narrowband Physical Downlink Control Channel (NB-PDCCH or NPDCCH) increases significantly considering that the NPDCCH needs to be transmitted using repetitions as well as for a significant number of NB-IoT IEs, thereby leading to scheduling restrictions due to blocking of other users DL or UL SCH scheduling. The additional transmission of the UL grant to provide HARQ-ACK feedback also leads to resource wastage in the DL as well as additional UE power consumption.

Accordingly, in various embodiments, to overcome the scheduling inefficiency for transmission of HARQ-ACK reports in the UL via separate UL grant transmission via NPDCCH, some of the relevant resource allocation information of the UL grant for HARQ-ACK reporting can be transmitted in the DCI carrying the DL assignment for the NPDSCH itself. Such information can include one or more of the following: the time domain resources (e.g., subframe location) for transmission of the HARQ-ACK report; the number of repetitions to use for the transmission of the HARQ-ACK report; the frequency domain resources within a subframe for NPUSCH transmissions using less than 12 subcarriers (i.e., for sub-PRB NPUSCH transmissions); and the cyclic shift or cover code information if any Code Division Multiplexing (CDM) is used for the NPUSCH transmissions carrying HARQ-ACK transmissions.

Figure 2:
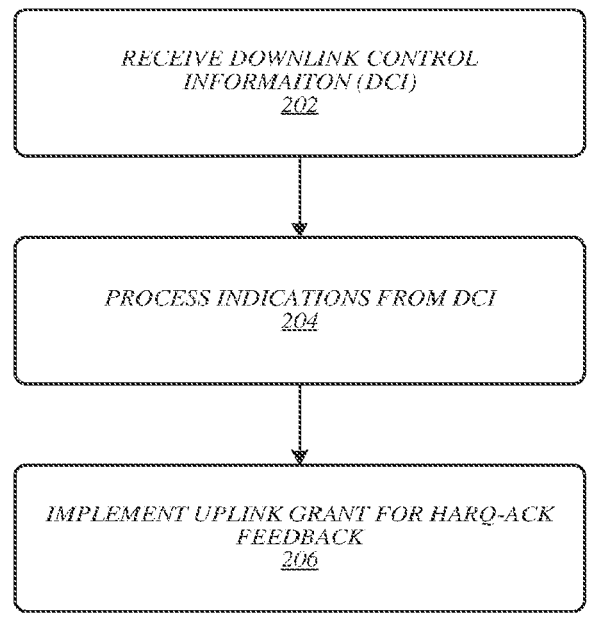
FIG. 2 illustrates an embodiment of a logic flow.

FIG. 2 illustrates an example of a logic flow 200 that may be representative of the implementation of one or more of the disclosed techniques for HARQ feedback. For example, logic flow 200 may be representative of operations that may be performed in some embodiments by mobile device 102 (e.g., as a UE) and/or base station 104 in operating environment 100 of FIG. 1. In general, the logic flow can represent operations performed by a mobile device (e.g., mobile device 102) in response to signaling information provided by a base station (e.g., the base station 104) to facilitate DL HARQ-ACK feedback from NB-IoT devices.

At 202, a mobile device can receive DCI. The DCI can be transmitted by a base station. The DCI can be DCI information carrying the DL assignment for the NPDSCH itself along with any other information.

At 204, the DCI information can be processed. In particular, one or more indications contained in the DCI can be processed to determine an UL grant for HARQ-ACK feedback. The DCI information can include information on one or more of the following: the time domain resources (e.g., subframe location) for transmission of the HARQ-ACK report; the number of repetitions to use for the transmission of the HARQ-ACK report; the frequency domain resources within a subframe for NPUSCH transmissions when using less than 12 subcarriers (e.g., for sub-PRB NPUSCH transmissions); and/or the cyclic shift or cover code information if any CDM is used for the NPUSCH transmissions carrying HARQ-ACK transmissions. This information can be provided by the base station to the mobile device via DCI. The mobile station can receive and process the DCI to recover this information to further effectuate HARQ-ACK feedback.

At 206, the uplink grant for HARQ-ACK feedback can be implemented. The uplink grant can be implemented based on information received and processed in one or more prior operations 202 and/or 204. As an example, a mobile device can generate and transmit HARQ-ACK feedback in accordance with an UL grant determined based on the logic flow 200 and can transmit the HARQ-ACK feedback to a base station. As part of implementing the uplink grant, a resource allocation for the HARQ-ACK feedback can be determined based on received information.

In various embodiments, the time domain resource information can include the first subframe to transmit the HARQ-ACK report. In various embodiments, this can be indicated via the DCI by a field that provides the time-gap with respect to the last subframe of the NPDSCH transmission. For example, the DCI can provide the value of an offset 'k' if the HARQ-ACK report is to be transmitted at the first available UL subframe after n+k subframes where 'n' is the subframe corresponding to the last repetition of the NPDSCH as indicated by the NPDCCH. The range of the values of 'k' can be limited within a set of values (e.g., 4≤k≤Kmax) where Kmax can either be specified (e.g., Kmax=10) or configured via higher layers. Accordingly, the time domain resource information can include an indication for directly determining or deriving the first subframe for transmitting HARQ-ACK feedback information.

In various embodiments, an offset can be determined based on a two bit field provided in the DCI. For example, the value of 'k' can be determined by adding a known offset (e.g., a value of 12) to a variable offset having a value that changes based on the value of the provided two bit field in the DCI. The variable offset can, for example, be a value determined by multiplying the two bit value by a scalar value (e.g., 2). As an example, if the two bit field is '00', then k can be equal to the known offset 12. If the two bit field is '01', representing 1, then k can be equal to the known offset 12 plus a value of 2, or 14. This pattern can be continued to enable two bit values of '10' and '11' to ultimately adjust the offset k to be equal to values of 16 and 18, respectively. Further, it is worthwhile to note that the value of k can be a time gap or offset measurement measured in milliseconds (ms). Under this scheme, k can be limited to a range of values from 12 to a maximum k value. The schemes allow a time gap to be determined such that a first subframe to transmit a HARQ-ACK report can be determined. Further, the values of the offset k can also be specified to be within a certain range such that k has a max value (e.g., from 12 to some max value Kmax).

In various embodiments, a certain set of UL subframes can be configured to carry HARQ-ACK reports via higher layers using a periodicity and offset in a UE-specific or cell-specific manner. For example, the DCI can point to or can indicate a specific index of the HARQ-ACK reporting subframe wherein the first subframe of the HARQ-ACK report transmission is transmitted by the UE. Any repetitions of the NPUSCH carrying the HARQ-ACK can be transmitted either on the consecutive valid/available UL subframes starting from the first one. Alternatively, repetitions of the NPUSCH carrying the HARQ-ACK can be transmitted only on the set of UL subframes that are configured to carry HARQ-ACK reports.

In various embodiments, a single redundancy version (RV), e.g., RV0, can be used to transmit any repetitions of the NPUSCH carrying HARQ-ACK transmissions, without any RV cycling.

In various embodiments, explicit time resource information can be absent and not indicated. Instead, the UE 102 can use the first occurrence of the HARQ-ACK reporting subframe to transmit the HARQ-ACK report 'k' subframes after the last subframe carrying the NPDSCH repetitions as indicated by the NPDCCH. In this case, 'k' can be specified and fixed, e.g., k=4.

In various embodiments, the number of repetitions used to transmit the HARQ-ACK feedback can be indicated using the DCI that would point to or indicate an index of the set of repetition numbers configured by higher layers.

In various embodiments, the frequency domain resource information can include the number of subcarriers to use for the NPUSCH transmission and the location of these subcarriers.

In various embodiments, higher layer signaling can be used to configure the UE 102 to use either 15 kHz or 3.75 kHz subcarrier spacing for NPUSCH. Single-tone transmission can be used for the 3.75 kHz subcarrier spacing. When higher layer signaling specifies subcarrier spacing, the subcarrier location can be indicated as part of the frequency domain resource information. In various embodiments, the subcarriers may be located at the edges of the 180 kHz NB-IoT carrier bandwidth, and the DCI can indicate which of the two edges can be used to transmit the NPUSCH carrying the HARQ-ACK report.

In various embodiments, in general a subset of possible subcarriers can either be predefined, for example by using the edge subcarriers or the central subcarriers. Alternatively, subcarriers can be configured on a UE-specific or a cell-specific basis via higher layers, and the exact subcarrier (or subcarriers) to use for HARQ-ACK can be indicated via the DC from this subset, thereby minimizing the DCI overhead. For 3.75 kHz subcarrier spacing, use of central subcarriers may provide robustness by minimizing the impact from interference from neighboring PRBs with 15 kHz subcarrier spacing.

In various embodiments, the subcarriers can be predefined and can be considered to be control subcarriers. For example, a set of 8 subcarriers can be predefined and available for use. Higher layer signaling and/or indications provided in the DCI can specify which of the 8 subcarriers are to be used (or if all 8 are to be used). In various embodiments, an offset can be provided which specifies the range of subcarriers. In various embodiments, the offset can be a negative value which specifies a range starting from an initial value to final value indicating the subcarriers. For example, an initial value can be 45, representing a first subcarrier, and an offset of 7 can be specified, which can be used to derive a second subcarrier of 38, thereby specifying overall that subcarriers from 38 to 45 are to be used.

In various embodiments, for single-tone transmissions used to provide HARQ-ACK feedback information, a subset of subcarriers can be configured by higher layers or can be specified. In various embodiments, the DCI carrying the DL assignment can indicate an offset or offset value or the particular subcarrier to use for DL HARQ-ACK feedback. As one example, the higher layer-configured set of candidate subcarriers can consist of four values and a 2-bit field in the DCI can indicate one of these four possible subcarriers to use from within the configured set.

In various embodiments, the base station 104 can indicate to the UE 102 the use of 15 kHz subcarrier spacing or 3.75 kHz subcarrier spacing through dynamically signaling via the DCI (e.g., by dynamically providing indications to the same in the DCI).

In various embodiments, the cyclic shift index that may be used for the demodulation reference signal (DM-RS) associated with the NPUSCH carrying HARQ-ACK, or the orthogonal cover code index may also be provided via the DCI if CDM is used to multiplex HARQ-ACK reports from different UEs. Alternatively, this can be configured to the UE 102 via higher layer signaling (e.g., in a UE-specific manner). In various embodiments, the orthogonal cover code (OCC) can be applied across a plurality of repetitions used for the NPUSCH transmissions. For example, a length-4 OCC can be used to multiplex up to 4 UEs transmitting NPUSCH with at least 4 repetitions. In this case, a small number of subcarriers may be used in the frequency domain and specify at least 4 repetitions in time-domain.

In various embodiments, the lowest modulation order defined for UL transmissions (e.g., BPSK or its phase rotated variant π/2-BPSK) can be used to modulate the encoded HARQ-ACK bits.

In various embodiments, the smallest supported transport block size (TBS) can be used with a 24-bit Cyclic Redundancy Check (CRC) attachment that can be same as used with NPUSCH for UL SCH transmissions. In this case, in various embodiments, for the payload portion of the transmission, the HARQ-ACK information (e.g., 1 bit) can be encoded using repetition coding to match the minimum TBS defined for UL SCH over NPUSCH without addition of any MAC or RLC headers.

In various embodiments, the HARQ-ACK bit can be repeated a specified number of times ($R_{A/N}$) that is smaller than the minimum supported TBS for UL SCH over NPUSCH. For example, $R_{A/N}$ can be set equal to 8 or 12 without any addition of MAC or RLC headers.

In various embodiments, a smaller CRC (e.g., a length 8 or length 16 CRC) may be used to reduce the overhead from CRC for HARQ-ACK reports using NPUSCH. In yet another embodiment, only the encoded HARQ-ACK bits (i.e., after application of repetition coding to the 1 bit HARQ-ACK information) are transmitted without any addition or MAC or RLC headers or even CRC attachment. In general, in various embodiments, the HARQ-ACK information can comprise a single bit, can use repetition coding, and can be provided without the addition of any headers.

In various embodiments, HARQ-ACK feedback information can be transmitted by the UE 102 using a newly developed Narrowband Physical Uplink Control Channel (NPUCCH or NPUCCH). In various embodiments, the NPUCCH design can be based on the NPUSCH physical structure with limited adaptations or modifications. Alternatively, the NPUCCH design can have a different physical structure compared to NPUSCH.

In various embodiments, the NPUCCH can be designed to be similar to the PUCCH format 3 defined in LTE. In another embodiment, the NPUCCH can be defined similar to the LTE PUCCH format 5 physical structure. Both these physical channel structures can support multiplexing of multiple UEs in a subframe. Accordingly, the NPUCCH resource to be used for HARQ-ACK reporting can be provided via higher layers including number of repetitions of the NPUCCH transmissions. Further, these NPUCCH formats may also be adapted from the LTE PUCCH format 3 and 5 to occupy only a set of subcarriers within a PRB.

In various embodiments, LTE PUCCH format 1/1a type structure can be used to define the NPUCCH spanning an entire PRB. Further, in another embodiment, the PUCCH format 1/a structure can be restricted to a smaller number of subcarriers, e.g., 1, 2, 3, or 6 in frequency domain. For this case, truncated sequences can be used for the NPUCCH base sequences used for DM-RS and data symbols. The single-tone version of this can be used by UEs configured with single-tone transmissions.

In various embodiments, for any structure of the NPUCCH, a certain set of subframes can be configured via common radio resource control (RRC) signaling (i.e., system information block (SIB) signaling) for transmission of HARQ-ACK. NB-IoT UEs may subsequently transmit HARQ-ACK reports using NPUCCH on these configured subframes. In one embodiment, the starting subframe of the NPUCCH transmission is the first occurring NPUCCH subframe 'k' subframes after the last subframe of the NPDSCH transmission as indicated by the NPDCCH, where 'k' is a predefined (specified) integer offset value (e.g., k=4.)

In another embodiment, wherein NPUCCH is designed to use less than 12 subcarriers, (e.g., 1 or 2 subcarriers) the NPUCCH subframes may even be present in each available/valid UL subframe.

In another embodiment, a new NPUCCH can be defined as a single tone transmission in order to provide 0 dB peak to average power ratio (PAPR) to thereby provide better coverage. Since 1 PRB PDSCH can be achievable for a single UE, the corresponding HARQ-ACK transmission after four subframes will be the ACK/NACK/DTX information for the UE without the need of resource assignment.

Figure 3:
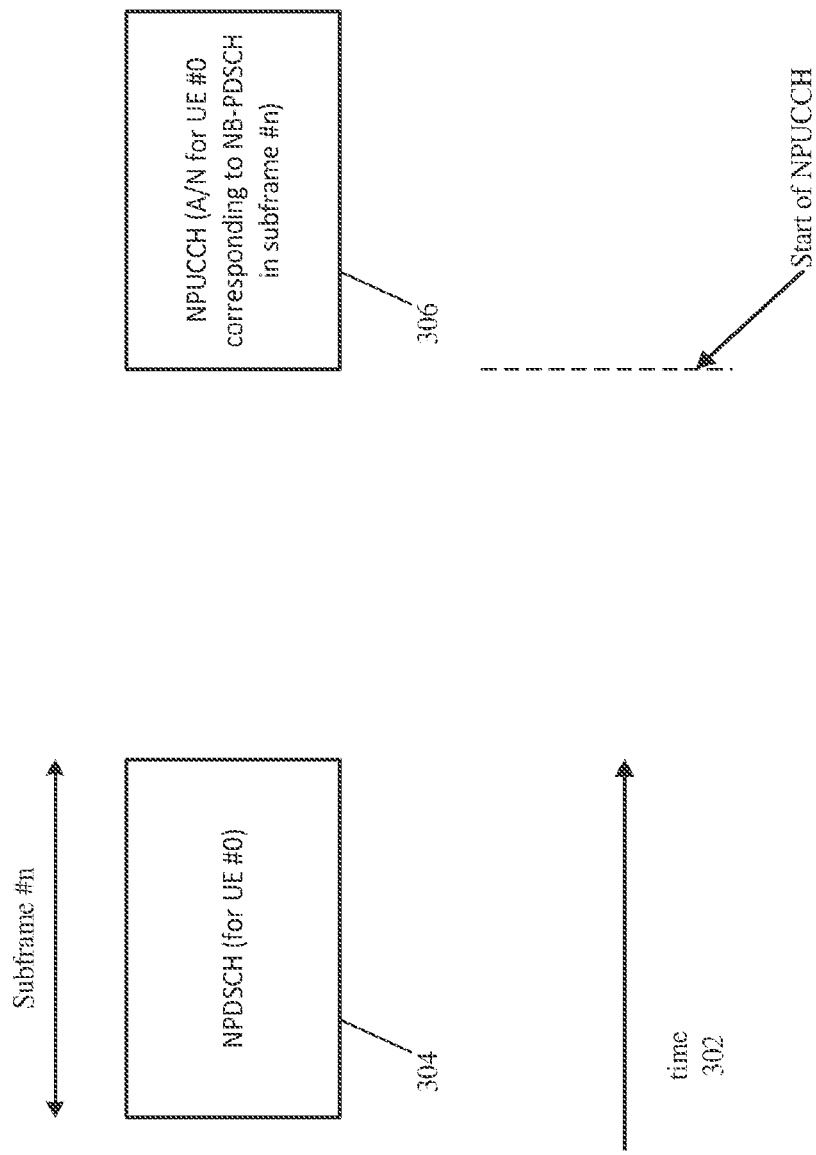
FIG. 3 illustrates an exemplary subframe structure for providing HARQ-ACK feedback information.

FIG. 3 illustrates an exemplary subframe structure 300 for providing HARQ-ACK feedback information. Specifically, an exemplary timing relationship between the last subframe 304 of an NPDSCH (e.g., subframe number 'n') and a start or starting time of a NPUCCH transmission 306 (e.g., subframe number 'n'+'k') is shown. The timing relationship shown can be a UE number 0 (e.g., the UE 102). The NPUCCH transmission 306 can be used for ACK/NACK (A/N). An indication of the time relationship is shown by indicator 302. As shown in FIG. 3, the NPUCCH transmission can be offset from the NPDSCH subframe 304 by an offset value 'k' which can be any specified value (e.g., 'k'=4, with 'k' indicated in received DCI). Since there is only one PDSCH for one UE in subframe n (as represented by the NPDSCH subframe 304), the PUCCH A/N (as represented by the NPUCCH transmission 306) can be for the UE associated with the PDSCH of subframe n. Accordingly, a starting time (e.g., a first transmission slot) for an UL transmission for HARQ-ACK feedback information can be specified.

Figure 4:
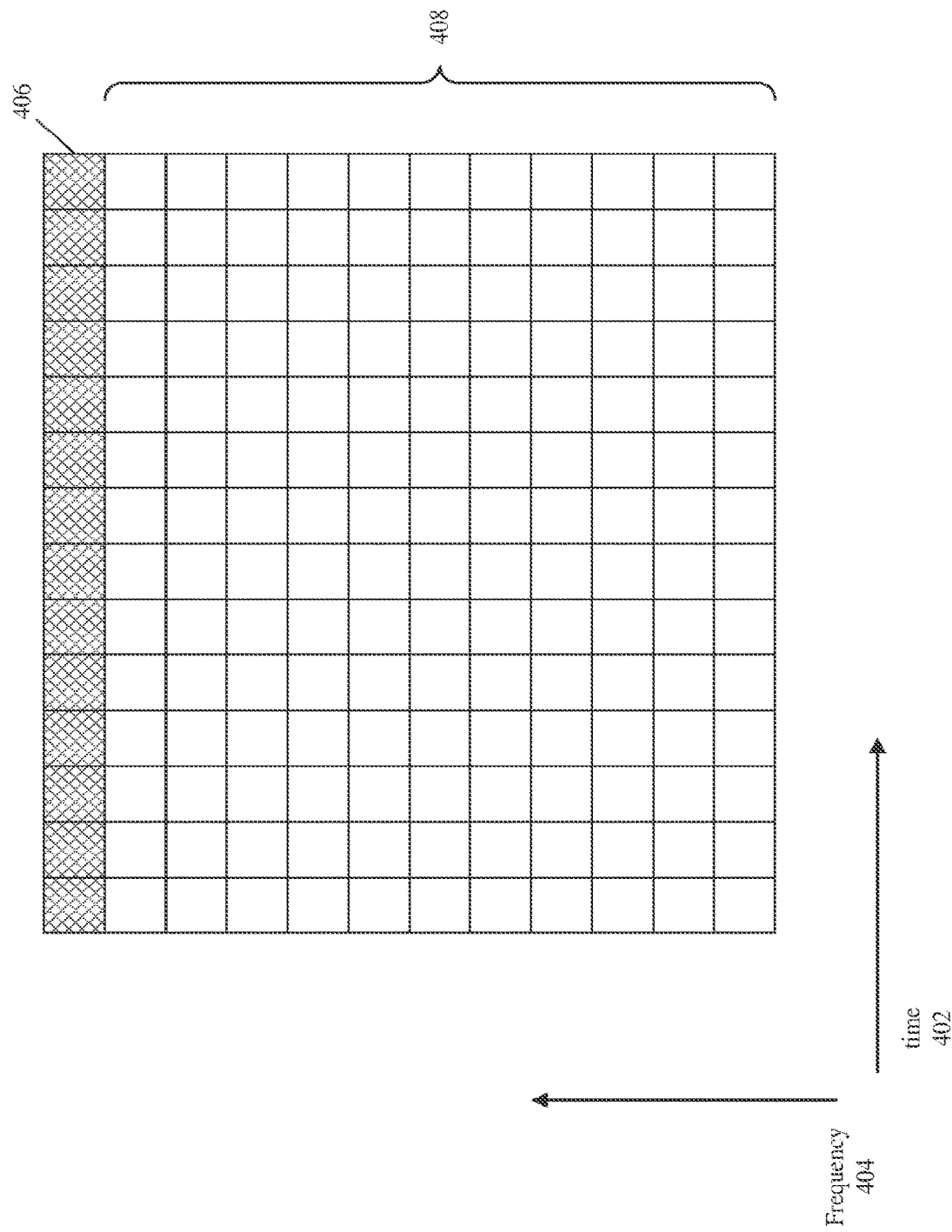
FIG. 4 illustrates an exemplary transmission scheme for HARQ-ACK feedback information.

FIG. 4 illustrates an exemplary transmission scheme 400 for HARQ-ACK feedback information. An indication of time is shown by element 402. Element 402 can represent SC-FDMA symbol index. An indication of frequency is shown by element 404. Element 404 can represent a subcarrier index (e.g., for a total of 12 possible subcarriers). The SC-FDMA symbol index 402 and the subcarrier index 404 can specify a number of resource elements (REs) (e.g., to form 1 PRB) that can be allocated for use in the transmission scheme for transmitting HARQ-ACK feedback by a UE (e.g., the UE 102).

In various embodiments, the transmission scheme 400 can represent a single subframe with respect to the SC-FDMA symbol index 402. HARQ-ACK transmission 406 by UE number 0 (e.g., UE 102) can use all REs for a single carrier (e.g., single tone transmission) within a NPUCCH transmission. The remaining REs 408 can represent NPUSCH transmission for other UEs (e.g., UEs other than UE number 0 or UE 102).

As shown in FIG. 4, the HARQ-ACK procedure provided by the transmission scheme 400 can be realized without UL scheduling restrictions. Considering the scheduling of UL data for other UEs using discrete Fourier transform (DFT) spread OFDM (DFT-S-OFDM), the PUCCH region (e.g., portion of region 406) can be positioned on the edge of the PRB so that the RE mapping after DT precoding can be done in the consecutive manner. The NPUCCH (e.g., region 406) may contain DM-RS REs so that coherent demodulation can be supported, RS position can be the same as LTE (e.g., by using symbol #3 in the first slot and symbol #3 in the second slot).

In various embodiments, binary phase-shift keying (BPSK) modulation can be used to effectuate HARQ-ACK feedback information. For example, BPSK modulation on the data part can be used such that "−1" can indicate ACK and "+1" can indicate NACK (and no transmission can be used for discontinuous transmission (DTX)).

Figure 5:
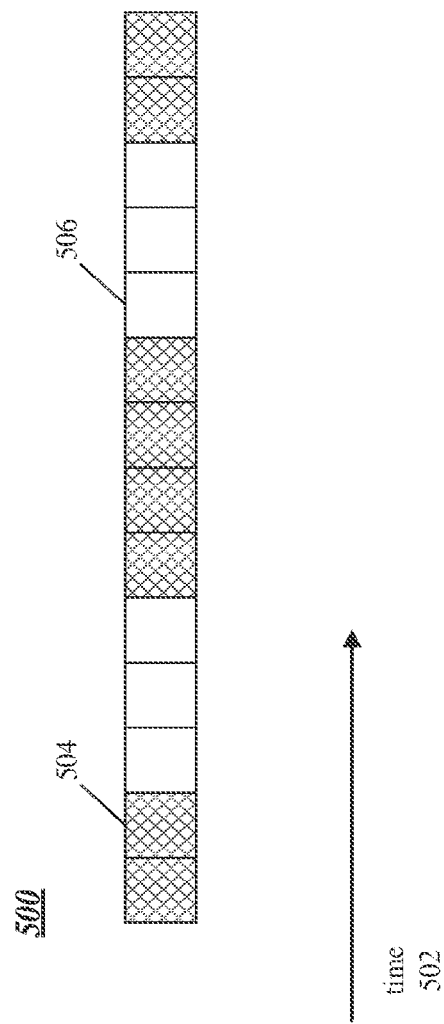
FIG. 5 illustrates an exemplary transmission structure for providing HARQ-ACK feedback information.

FIG. 5 illustrates an exemplary transmission structure 500 for providing HARQ-ACK feedback information. The transmission structure 500 can represent a portion of the NPUCCH for providing HARQ-ACK feedback information from a UE (e.g., the UE 102). An indication of time is shown by element 502. Element 502 can represent SC-FDMA symbol index.

As shown in FIG. 5, REs 504 can represent the data portion of the NPUCCH. The REs 504 can include BPSK or π/2-BPSK modulated data as described above, REs 506 can represent reference signal (RS) information. As shown, a same range of frequencies or carrier can be used to carry REs 504 and 506 such that RS information and HARQ-ACK feedback information are together provided. The NPUCCH transmission structure 500 may be a subframe. In various embodiments, the NPUCCH transmission structure 500 may not contain specific DM-RS REs 506 such that energy detection (e.g., on/off keying) can be used for carrying HARQ-ACK information. For example, signal existence can indicate ACK while no can indicate NACK or DTX.

Figure 6:
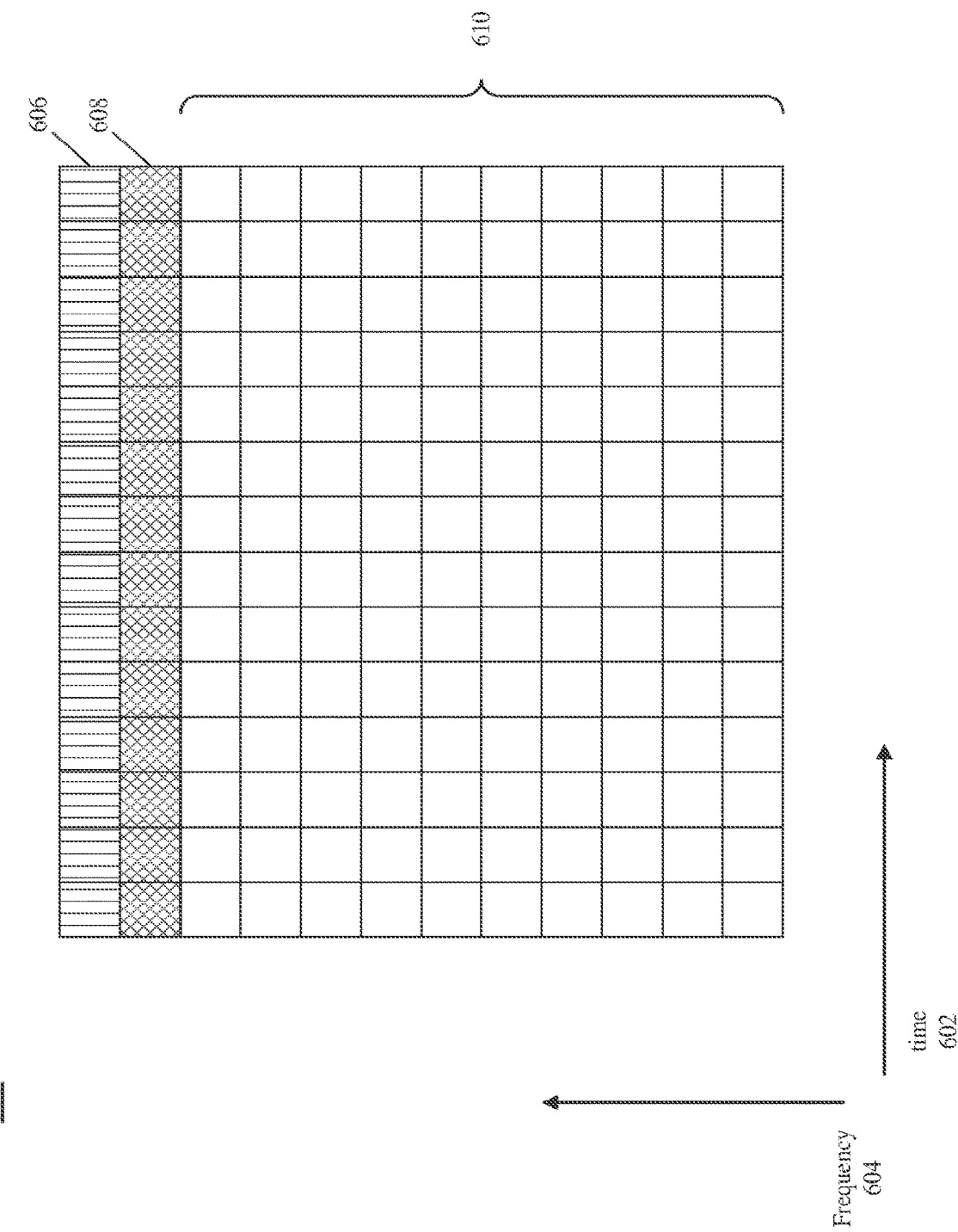
FIG. 6 illustrates a second exemplary transmission scheme for HARQ-ACK feedback information.

FIG. 6 illustrates an exemplary transmission scheme 600 for HARQ-ACK feedback information. An indication of time is shown by element 602. Element 602 can represent SC-FDMA symbol index. An indication of frequency is shown by element 604. Element 604 can represent a subcarrier index (e.g., for a total of 12 possible subcarriers). The SC-FDMA symbol index 602 and the subcarrier index 604 can specify a number of resource elements (REs) (e.g., to form 1 PRB) that can be allocated for use in the transmission scheme for transmitting HARQ-ACK feedback by a UE (e.g., the UE 102).

In various embodiments, the transmission scheme 600 can represent a single subframe with respect to the SC-FDMA symbol index 602. HARQ-ACK transmission 608 by UE number 0 (e.g., UE 102) can use all REs for a single carrier (e.g., single tone transmission) within a NPUCCH transmission. A first set of the remaining REs 610 can represent NPUSCH transmission for other UEs (e.g., UEs other than UE number 0 or UE 102). A second set of the remaining REs 606 can represent guard REs. The guard REs 606 can be not used.

The transmission scheme 600 provides a number of benefits. The guard REs 606 can be adjacent to PRBs which can absorb adjacent leakage. Further, the NPUSCH (represented by section or REs 610) can be contiguous so that all remaining 10 RE subframes can be used for data in DFT-S-OFDM. Further, a DFT length of 10 can be used, which has factors of 2 and 5, and therefore can satisfy the LTE DFT length requirement (i.e., of factors 2, 3, and 5). Accordingly, the same butterfly structure for implementing the DFT can be reused. The NPUCCH structure 606 can be implemented using any of the above described schemes for providing or transmitting the NPUCCH (such as for example, as depicted in FIG. 5).

In general, any of the techniques described herein for the use of NPUSCH based HARQ-ACK feedback for the determination of resources and configuration for HARQ-ACK transmission can also be applied to the approaches described above that are based on defining a new or modified NPUCCH physical structure. Further, each of the transmission schemes and structures described herein (e.g., the schemes and structures illustrated in FIGS. 3-6) can be implemented based on the logic flow 200.

Figure 7:
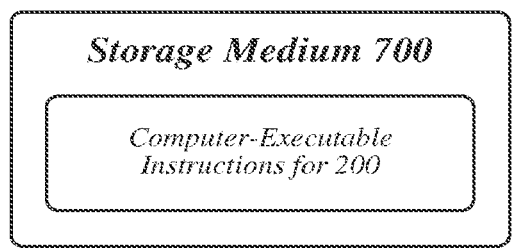
FIG. 7 illustrates an embodiment of a storage medium.

FIG. 7 illustrates an embodiment of a storage medium 700. Storage media 700 may comprise any non-transitory computer-readable storage media or machine-readable storage media, such as an optical, magnetic or semiconductor storage media. In various embodiments, storage media 700 may comprise an article of manufacture. In some embodiments, storage media 700 may store computer-executable instructions, such as computer-executable instructions to implement logic flow 200 of FIG. 2. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 8:
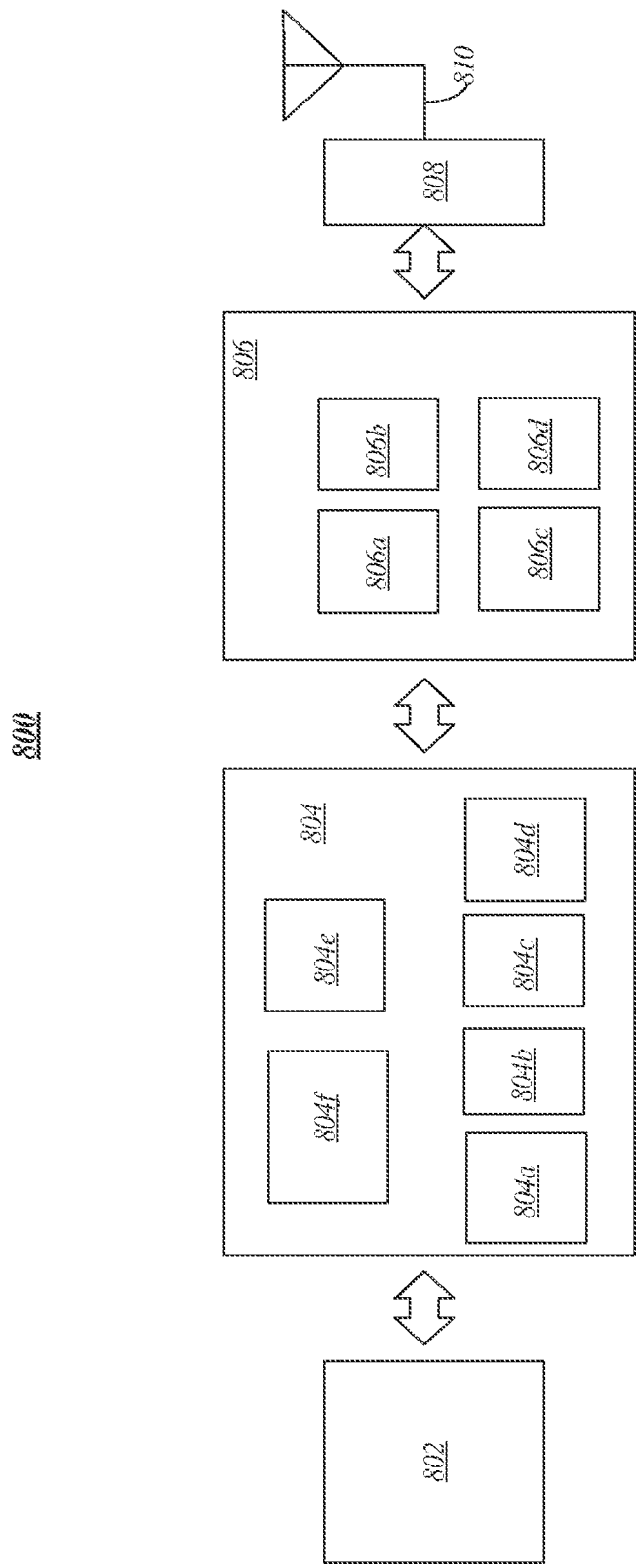
FIG. 8 illustrates an embodiment of a first device.

FIG. 8 illustrates an example of a mobile device 800 that may be representative of a mobile device such as, for example, a UE that implements one or more of the disclosed techniques in various embodiments. For example, mobile device 800 may be representative of mobile device 102 according to some embodiments. In some embodiments, the mobile device 800 may include application circuitry 802, baseband circuitry 804. Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the mobile device 800 may include additional elements such as, for example, memory/storage, display, camera, sensor, and/or input/output (I/O) interface.

Figure 9:
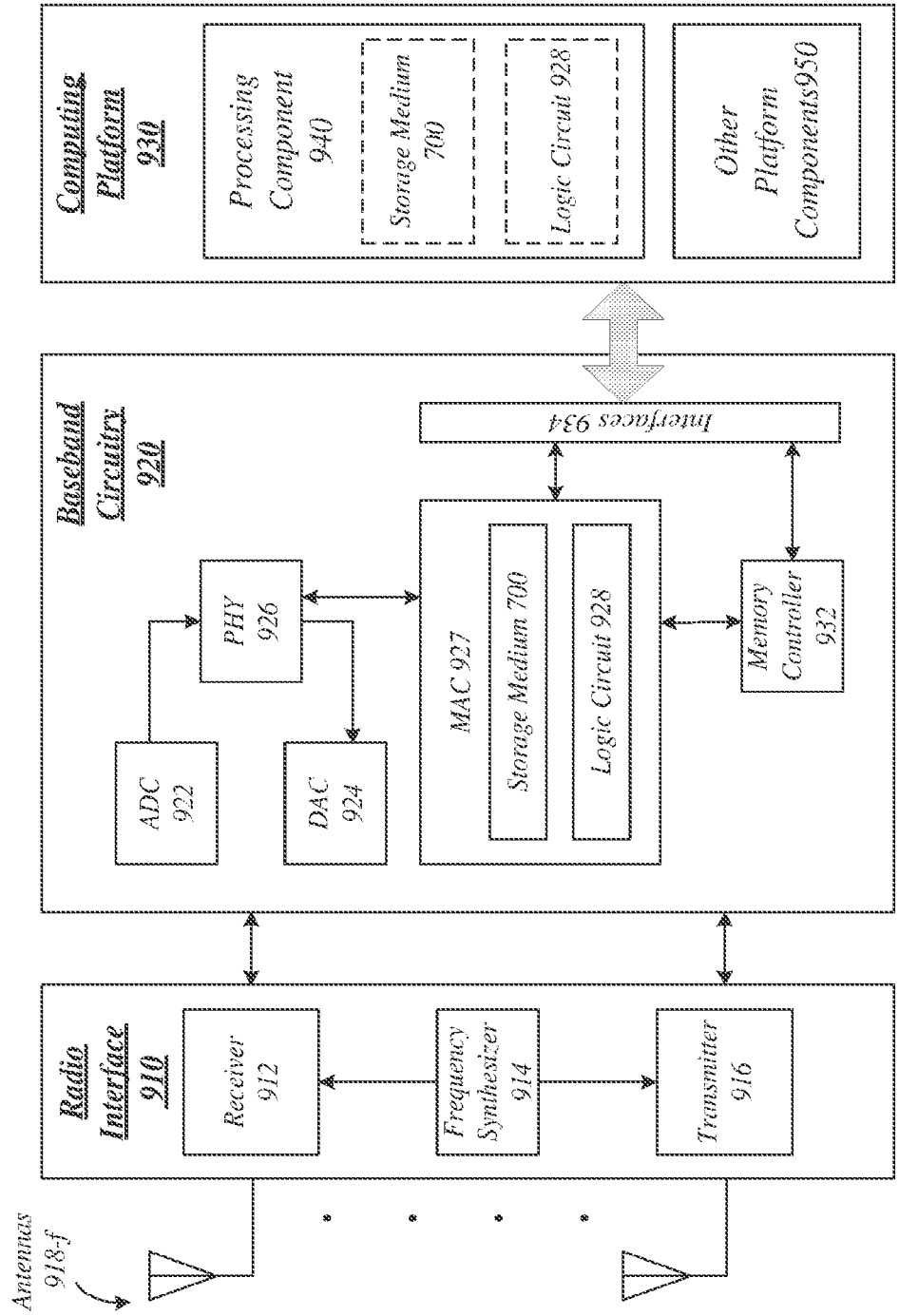
FIG. 9 illustrates an embodiment of a second device.

FIG. 9 illustrates an embodiment of a communications device 900 that may implement one or more of mobile device 102, base station 104, logic flow 200, storage medium 700, and the mobile device 800. In various embodiments, device 900 may comprise a logic circuit 928. The logic circuit 928 may include physical circuits to perform operations described for one or more of mobile device 102, base station 104, logic flow 200, storage medium 700, and the mobile device 800 for example. As shown in FIG. 9, device 900 may include a radio interface 910, baseband circuitry 920, and computing platform 930, although the embodiments are not limited to this configuration.

The device 9M may implement some or all of the structure and/or operations for one or more of mobile device 102, base station 104, logic flow 200, storage medium 700, and the mobile device 800, and logic circuit 928 in a single computing entity, such as entirely within a single device. Alternatively, the device 900 may distribute portions of the structure and/or operations for one or more of mobile device 102, base station 104, logic flow 200, storage medium 700, and the mobile device 800, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-f. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, a mixer for down-converting received RF signals, an analog-to-digital converter 922 for converting analog signals to digital form, a digital-to-analog converter 924 for converting digital signals to analog form, and a mixer for up-converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of mobile device 102, base station 104, logic flow 200, storage medium 700, and the mobile device 800, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA) memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-*f*) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
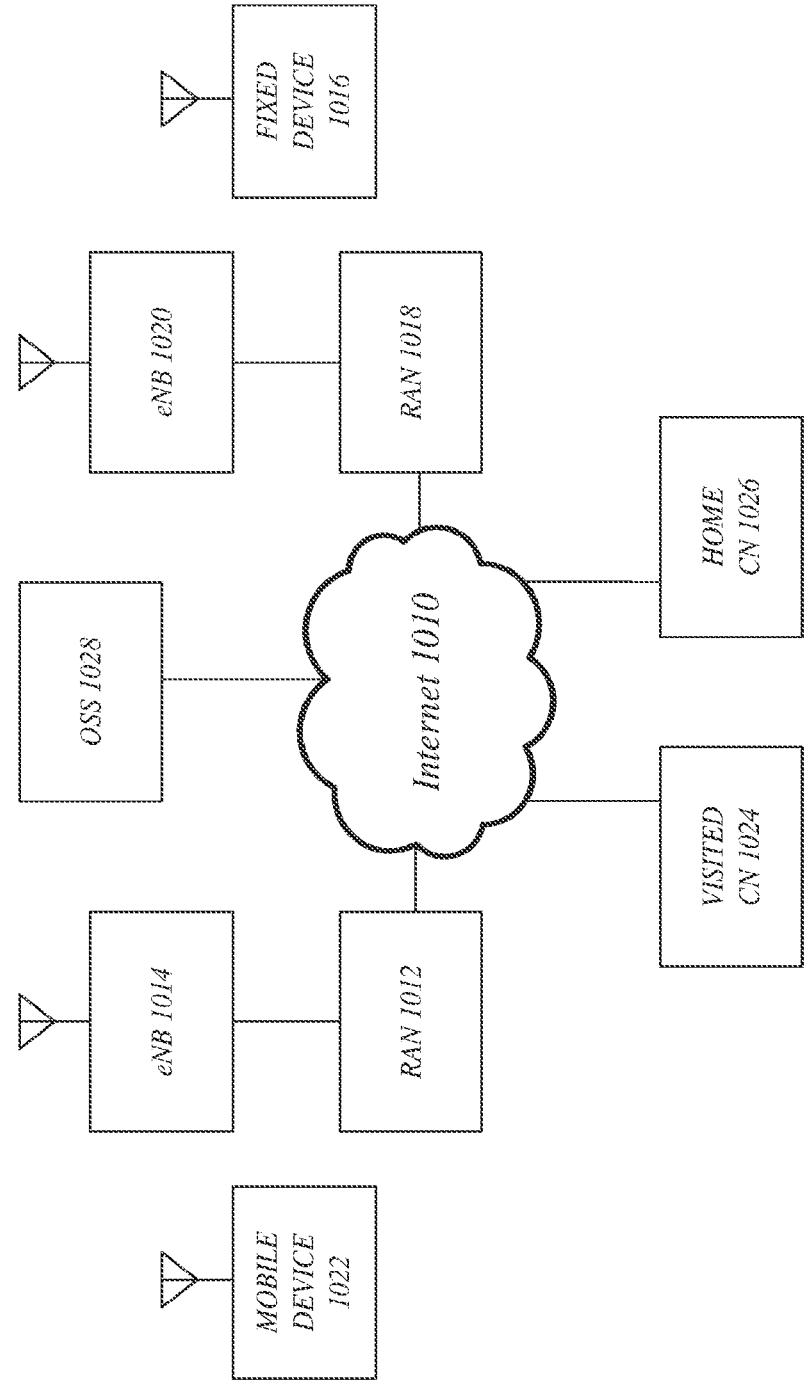
FIG. 10 illustrates an embodiment of a wireless network.

FIG. 10 illustrates an embodiment of a broadband wireless access system 1000. As shown in FIG. 10, broadband wireless access system 1000 may be an internet protocol (IP) type network comprising an internet 1010 type network or the like that is capable of supporting mobile wireless access and/or fixed wireless access to internet 1010. In one or more embodiments, broadband wireless access system 1000 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1000, radio access networks (RANs) 1012 and 1018 are capable of coupling with evolved nodeBs or base stations (eNBs) 1014 and 1020, respectively, to provide wireless communication between one or more fixed devices 1016 and internet 1010 and/or between or one or more mobile devices 1022 and Internet 1010. One example of a fixed device 1016 and a mobile device 1022 is device 1200 of FIG. 12, with the fixed device 1016 comprising a stationary version of device 1200 and the mobile device 1022 comprising a mobile version of device 1200. RANs 1012 and 1018 may implement profiles that are capable of defining the mapping of network functions to one or more physical entities on broadband wireless access system 1000. eNBs 1014 and 1020 may comprise radio equipment to provide RF communication with fixed device 1016 and/or mobile device 1022, such as described with reference to device 1200, and may comprise, for example, the PHY and MAC layer 1*o* equipment in compliance with a 3GPP LTE Specification or an IEEE 802.16 Standard, Base stations or eNBs 1014 and 1020 may further comprise an IP backplane to couple to Internet 1010 via RANs 1012 and 1018, respectively, although the scope of the claimed subject matter is not limited in these respects.

Broadband wireless access system 1000 may further comprise a visited core network (CN) 1024 and/or a home CN 1026, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these am merely example of the types of functions that are capable of being provided by visited CN 1024 and/or home CN 1026, and the scope of the claimed subject matter is not limited in these respects. Visited CN 1024 may be referred to as a visited CN in the case where visited CN 1024 is not part of the regular service provider of fixed device 1016 or mobile device 1022, for example where fixed device 1016 or mobile device 1022 is roaming away from its respective home CN 1026, or where broadband wireless access system 1000 is part of the regular service provider of fixed device 1016 or mobile device 1022 but where broadband wireless access system 1000 may be in another location or state that is not the main or home location of fixed device 1016 or mobile device 1022. The embodiments are not limited in this context.

Fixed device 1016 may be located anywhere within range of one or both of base stations or eNBs 1014 and 1020, such as in or near a home or business to provide home or business customer broadband access to Internet 1010 via base stations or eNBs 1014 and 1020 and RANs 1012 and 1018, respectively, and home CN 1026. It is worthy of note that although fixed device 1016 is generally disposed in a stationary location, it may be moved to different locations as needed. Mobile device 1022 may be utilized at one or more locations if mobile device 1022 is within range of one or both of base stations or eNBs 1014 and 1020, for example. In accordance with one or more embodiments, operation support system (OSS) 1028 may be part of broadband wireless access system 1000 to provide management functions for broadband wireless access system 1000 and to provide interfaces between functional entities of broadband wireless access system 1000. Broadband wireless access system 1000 of FIG. 10 is merely one type of wireless network showing a certain number of the components of broadband wireless access system 1000, and the scope of the claimed subject matter is not limited in these respects.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a narrowband Internet of Things (NB-IoT) user equipment (E) comprising: a memory and baseband circuitry coupled to the memory, the baseband circuitry to decode an indication contained in received downlink control information (DCI), determine an uplink (UL) resource allocation (or grant) for hybrid automatic repeat request (HARQ) feedback based on the indication for inclusion on a narrowband physical uplink shared channel (NPUSCH) or a narrowband physical uplink control channel (NPUCCH), and encode the HARQ feedback for inclusion on one of the NPUSCH or NPUCCH.

Example 2 is an extension of Example 1 or any other example disclosed herein, the indication to indicate one or more of a time domain resource, a number of repetitions, a frequency domain resource, and a cyclic shift.

Example 3 is an extension of Example 2 or any other example disclosed herein, the indication to indicate a starting time for transmission of the HARQ feedback.

Example 4 is an extension of Example 3 or any other example disclosed herein, the indication to indicate an offset between a last frame of a narrowband physical downlink shared channel (NPDSCH) and the starting time for transmission of the HARQ feedback.

Example 5 is an extension of Example 4 or any other example disclosed herein, the offset to be less than or equal to a maximum value.

Example 6 is an extension of Example 2 or any other example disclosed herein, the indication to specify a predetermined set of UL time domain resources designated for inclusion of the HARQ feedback.

Example 7 is an extension of Example 6 or any other example disclosed herein, the predetermined set of UL time domain resources determined by higher layer signaling.

Example 8 is an extension of Example 7 or any other example disclosed herein, repetitions of the HARQ feedback encoded for inclusion on consecutive UL slots.

Example 9 is an extension of Example 7 or any other example disclosed herein repetitions of the HARQ feedback encoded for inclusion on consecutive UL slots within the specified predetermined set of UL time domain resources designated for inclusion of the HARQ feedback.

Example 10 is an extension of Example 2 or any other example disclosed herein, the indication to indicate use of a single redundancy version (RV) for repetitions of the HARQ feedback.

Example 11 is an extension of Example 10 or any other example disclosed herein, the RV to comprise RV0.

Example 12 is an extension of Example 2 or any other example disclosed herein, the indication to indicate a number of subcarriers for the UL resource allocation.

Example 13 is an extension of Example 12 or any other example disclosed herein, the indication to indicate a location of the subcarriers for the UL resource allocation.

Example 14 is an extension of Example 13 or any other example disclosed herein, the indication to indicate a set of predefined subcarriers for the UL resource allocation.

Example 15 is an extension of Example 13 or any other example disclosed herein, the indication to indicate a predefined subcarrier spacing for the UL resource allocation.

Example 16 is an extension of Example 13 or any other example disclosed herein, the indication to indicate a single subcarrier for the UL resource allocation based on a two-hit field.

Example 17 is an extension of Example 13 or any other example disclosed herein, the indication to indicate one of a first edge, a second edge, or a center for the location of the subcarriers for the UL resource allocation within an operating bandwidth.

Example 18 is an extension of Example 13 or any other example disclosed herein, the indication to indicate an offset for determining one or more subcarriers for the UL resource allocation.

Example 19 is an extension of Example 2 or any other example disclosed herein, the indication to indicate a modulation scheme for encoding the HARQ feedback.

Example 20 is an extension of Example 19 or any other example disclosed herein, the modulation scheme to comprise binary phase shift keying (BPSK).

Example 21 is an extension of Example 19 or any other example disclosed herein, the modulation scheme to comprise $\pi/2$-binary phase shift keying (BPSK).

Example 22 is an extension of Example 2 or any other example disclosed herein, the HARQ feedback encoded based on repetition coding to match a minimum transport block size (TBS) defined for the UL shared channel (SCH) over the NPUSCH excluding headers.

Example 23 is an extension of Example 22 or any other example disclosed herein, the HARQ feedback repeated a first specified number of times to indicate an acknowledgement and repeated a second specified number of times to indicate a non-acknowledgement.

Example 24 is an extension of Example 22 or any other example disclosed herein, the HARQ feedback encoded without a cyclic redundancy check (CRC).

Example 25 is an extension of Example 2 or any other example disclosed herein, the HARQ feedback included in the NPUCCH and the UL resource allocation to comprise a single subcarrier for a slot.

Example 26 is an extension of Example 25 or any other example disclosed herein, the HARQ feedback encoded by multiplexing with reference signals.

Example 27 is an extension of Example 26 or any other example disclosed herein, the HARQ feedback encoded by binary phase shift keying (BPSK).

Example 28 is an extension of Example 25 or any other example disclosed herein, the HARQ feedback included in the NB-PUCCH and the UL resource allocation to comprise guard subcarriers positioned at edges of the NB-IoT physical resource block (NB-IoT PRB).

Example 29 is an extension of any of Example 1 to 28 or any other example disclosed herein, the NB-IoT UE comprising at least one radio frequency (RF) transceiver and at least one RF antenna.

Example 30 is a wireless communication method comprising decoding an indication contained in received downlink control information (DCI), determining an uplink (UL) resource allocation (or grant) for hybrid automatic repeat request (HARQ) feedback based on the indication for inclusion on a narrowband physical uplink shared channel (NPUSCH) or a narrowband physical uplink control channel (NPUCCH), and encoding the HARQ feedback for inclusion on one of the NPUSCH or NPUCCH.

Example 31 is an extension of Example 30 or any other example disclosed herein, the indication indicating one or more of a time domain resource, a number of repetitions, a frequency domain resource, and a cyclic shift.

Example 32 is an extension of Example 31 or any other example disclosed herein, the indication indicating a first slot for inclusion of the HARQ feedback.

Example 33 is an extension of Example 32 or any other example disclosed herein, the indication indicating an offset between a last frame of a narrowband physical downlink shared channel (NPDSCH) and the first slot.

Example 34 is an extension of Example 31 or any other example disclosed herein, the indication specifying a predetermined set of UL time domain resources designated for inclusion of the HARQ feedback.

Example 35 is an extension of Example 34 or any other example disclosed herein, the predetermined set of UL time domain resources determined by higher layer signaling.

Example 36 is an extension of Example 35 or any other example disclosed herein, encoding repetitions of the HARQ feedback for inclusion on consecutive UL slots.

Example 37 is an extension of Example 35 or any other example disclosed herein, encoding repetitions of the HARQ feedback for inclusion on consecutive UL slots within the specified predetermined set of UL time domain resources designated for inclusion of the HARQ feedback.

Example 38 is an extension of Example 31 or any other example disclosed herein, the indication indicating use of a single redundancy version (RV) for repetitions of the HARQ feedback.

Example 39 is an extension of Example 31 or any other example disclosed herein, the indication indicating a number of subcarriers for the UL resource allocation.

Example 40 is an extension of Example 39 or any other example disclosed herein, the indication indicating a location of the subcarriers for the UL resource allocation.

Example 41 is an extension of Example 40 or any other example disclosed herein, the indication indicating a set of predefined subcarriers for the UL resource allocation.

Example 42 is an extension of Example 40 or any other example disclosed herein, the indication indicating a predefined subcarrier spacing for the UL resource allocation.

Example 43 is an extension of Example 40 or any other example disclosed herein, the indication indicating a single subcarrier for the UL resource allocation based on a two bit field.

Example 44 is an extension of Example 40 or any other example disclosed herein, the indication to indicating one of a first edge, a second edge, or a center for the location of the subcarriers for the UL resource allocation within an operating bandwidth.

Example 45 is an extension of Example 40 or any other example disclosed herein, the indication indicating an offset for determining one or more subcarriers for the UL resource allocation.

Example 46 is an extension of Example 31 or any other example disclosed herein, the indication indicating a modulation scheme for encoding the HARQ feedback.

Example 47 is an extension of Example 46 or any other example disclosed herein, the modulation scheme comprising binary phase shift keying (BPSK).

Example 48 is an extension of Example 46 or any other example disclosed herein, the modulation scheme comprising $\pi/2$-binary phase shift keying (BPSK).

Example 49 is an extension of Example 31 or any other example disclosed herein, encoding the HARQ feedback based on repetition coding to match a minimum transport block size (TBS) defined for the UL shared channel (SCH) over the NPUSCH excluding headers.

Example 50 is an extension of Example 49 or any other example disclosed herein, repeating the HARQ feedback a first specified number of times to indicate an acknowledgement and repeated a second specified number of times to indicate a non-acknowledgement.

Example 51 is an extension of Example 49 or any other example disclosed herein, encoding the HARQ feedback without a cyclic redundancy check (CRC).

Example 52 is an extension of Example 31 or any other example disclosed herein, including the HARQ feedback in the NPUCCH and the UL resource allocation to comprise a single subcarrier for a slot.

Example 53 is an extension of Example 52 or any other example disclosed herein, encoding the HARQ feedback by multiplexing with reference signals.

Example 54 is an extension of Example 52 or any other example disclosed herein, encoding the HARQ feedback by binary phase shift keying (BPSK).

Example 55 is an extension of Example 52 or any other example disclosed herein, including the HARQ feedback in the NB-PUCCH and the UL resource allocation to comprise guard subcarriers positioned at edges of the NB-IoT physical resource block (NB-IoT PRB).

Example 56 is at least one computer-readable storage medium comprising a set of instructions that, in response to being executed on a computing device, cause the computing device to perform a wireless communication method according to any of Examples 30 to 55 or any other example disclosed herein.

Example 57 is a user equipment (UE) comprising means for performing a wireless communication method according to any of Examples 30 to 55 or any other example disclosed herein.

Example 58 is at least one computer-readable storage medium comprising a set of wireless communication instructions that, in response to being executed on a computing device, cause the computing device to decode an indication contained in received downlink control information (DCI), determine an uplink (UL) resource allocation (or grant) for hybrid automatic repeat request (HARQ) feedback for inclusion on a narrowband physical uplink shared channel (NPUSCH) or a narrowband physical uplink control channel (NPUCCH) based on the indication, and encode the HARQ feedback for inclusion on one of the NPUSCH or NPUCCH.

Example 59 is an extension of Example 58 or any other example disclosed herein, comprising wireless communication instructions that, in response to being executed on the computing device, cause the computing device to determine one or more of a time domain resource, a number of repetitions, a frequency domain resource, and a cyclic shift.

Example 60 is an extension of Example 59 or any other example disclosed herein, comprising wireless communication instructions that, in response to being executed on the computing device, cause the computing device to determine a first slot for inclusion of the HARQ feedback.

Example 61 is an extension of Example 60 or any other example disclosed herein, comprising wireless communication instructions that, in response to being executed on the computing device, cause the computing device to decode an offset between a last frame of a narrowband physical downlink shared channel (NPDSCH) and the first slot.

Example 62 is an extension of Example 59 or any other example disclosed herein, comprising wireless communication instructions that, in response to being executed on the computing device, cause the computing device to determine a predetermined set of UL time domain resources designated for inclusion of the HARQ feedback.

Example 63 is an extension of Example 62 or any other example disclosed herein, comprising wireless communication instructions that, in response to being executed on the computing device, cause the computing device to encode repetitions of the HARQ feedback for inclusion on consecutive UL time domain resources.

Example 64 is an extension of Example 62 or any other example disclosed herein, comprising wireless communication instructions that, in response to being executed on the computing device, cause the computing device to encode repetitions of the HARQ feedback for inclusion on consecutive UL slots within the specified predetermined set of UL time domain slots designated for inclusion of the HARQ feedback.

Example 65 is an extension of Example 59 or any other example disclosed herein, comprising wireless communication instructions that, in response to being executed on the computing device, cause the computing device to encode repetitions of the HARQ feedback based on a single redundancy version (RV) for.

Example 66 is an extension of Example 59 or any other example disclosed herein, comprising wireless communication instructions that, in response to being executed on the computing device, cause the computing device to determine a number of subcarriers for the UL resource allocation.

Example 67 is an extension of Example 66 or any other example disclosed herein, comprising wireless communication instructions that, in response to being executed on the computing device, cause the computing device to determine a location of the subcarriers for the UL resource allocation.

Example 68 is an extension of Example 67 or any other example disclosed herein, comprising wireless communication instructions that, in response to being executed on the computing device, cause the computing device to determine a set of predefined subcarriers for the UL resource allocation.

Example 69 is an extension of Example 67 or any other example disclosed herein, comprising wireless communication instructions that, in response to being executed on the computing device, cause the computing device to determine a predefined subcarrier spacing for the UL resource allocation.

Example 70 is an extension of Example 67 or any other example disclosed herein, comprising wireless communication instructions that, in response to being executed on the computing device, cause the computing device to determine a single subcarrier for the UL resource allocation based on a two bit-field.

Example 71 is an extension of Example 67 or any other example disclosed herein, comprising wireless communication instructions that, in response to being executed on the computing device, cause the computing device to determine one of a first edge, a second edge, or a center for the location of the subcarriers for the UL resource allocation within an operating bandwidth.

Example 72 is an extension of Example 67 or any other example disclosed herein, comprising wireless communication instructions that, in response to being executed on the computing device, cause the computing device to decode an offset for determining one or more subcarriers for the UL resource allocation.

Example 73 is an extension of Example 59 or any other example disclosed herein, comprising wireless communication instructions that, in response to being executed on the computing device, cause the computing device to determine a modulation scheme for encoding the HARQ feedback.

Example 74 is an extension of Example 59 or any other example disclosed herein, comprising wireless communication instructions that, in response to being executed on the computing device, cause the computing device to encode the HARQ feedback based on repetition coding to match a minimum transport block size (TBS) defined for the UL shared so channel (SCH) over the NPUSCH excluding headers.

Example 75 is an extension of Example 74 or any other example disclosed herein, comprising wireless communication instructions that, in response to being executed on the computing device, cause the computing device to repeat the HARQ feedback a first specified number of times to indicate an acknowledgement and repeated a second specified number of times to indicate a non-acknowledgement.

Example 76 is an extension of Example 74 or any other example disclosed herein, comprising wireless communication instructions that, in response to being executed on the computing device, cause the computing device to encode the HARQ feedback without a cyclic redundancy check (CRC).

Example 77 is an extension of Example 59 or any other example disclosed herein, comprising wireless communication instructions that, in response to being executed on the computing device, cause the computing device to include the HARQ feedback in the NPUCCH and the UL resource allocation to comprise a single subcarrier for a slot.

Example 78 is an extension of Example 77 or any other example disclosed herein, comprising wireless communication instructions that, in response to being executed on the computing device, cause the computing device to encode the HARQ feedback by multiplexing with reference signals.

Example 79 is an extension of Example 77 or any other example disclosed herein, comprising wireless communication instructions that, in response to being executed on the computing device, cause the computing device to encode the HARQ feedback by binary phase shift keying (BPSK).

Example 80 is an extension of Example 77 or any other example disclosed herein, comprising wireless communication instructions that, in response to being executed on the computing device, cause the computing device to include the HARQ feedback in the NB-PUCCH and the UL resource allocation to comprise guard subcarriers positioned at edges of the NB-IoT physical resource block (NB-IoT PRB).

Example 81 is a narrowband Internet of Things (NB-IoT) user equipment (UE), comprising a memory, radio frequency (RF) circuitry, the RF circuitry to receive downlink control information (DCI), and baseband circuitry coupled to the memory and coupled to the RF circuitry, the baseband circuitry to decode an indication contained in the received downlink control information (DCI), determine an uplink (UL) resource allocation for hybrid automatic repeat request (HARQ) feedback for inclusion on a narrowband physical uplink shared channel (NPUSCH) or a narrowband physical uplink control channel (NPUCCH) based on the indication, and encode the HARQ feedback for inclusion on one of the NPUSCH or NPUCCH, the RF circuitry to transmit the HARQ feedback on one of the NPUSCH or NPUCCH.

Example 82 is an extension of Example 81 or any other example disclosed herein, the indication to indicate an offset between a last frame of a narrowband physical downlink shared channel (NPDSCH) and a first slot for inclusion of the HARQ feedback.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A user equipment (UE), comprising:
   a memory; and a baseband processor coupled to the memory, the baseband processor configured to perform operations corresponding to:

decoding an indication contained in received downlink control information (DCI), carrying a downlink assignment for a narrowband physical downlink shared channel (NPDSCH), wherein the indication indicates time domain resources and a frequency domain resource for transmission of hybrid automatic repeat request (HARQ) feedback on a narrowband physical uplink shared channel (NPUSCH);

determining an uplink (UL) resource allocation for HARQ feedback based on the indication; and encoding the HARQ feedback for transmission on the NPUSCH using the determined UL resource allocation.

2. The UE of claim 1, wherein the indication indicates an offset between a last subframe of the NPDSCH and a first subframe for transmission of the HARQ feedback.

3. The UE of claim 1, wherein the indication indicates a starting time for transmission of the HARQ feedback.

4. The UE of claim 1, wherein the indication indicates time domain resources corresponding to a subframe location.

5. The UE of claim 1, wherein the indication indicates an offset between a last subframe of the NPDSCH and a starting time for transmission of the HARQ feedback.

6. The UE of claim 1, wherein the indication indicates an index of a first subframe for transmission of the HARQ feedback.

7. The UE of claim 1, wherein the indication indicates a number of subcarriers for the UL resource allocation.

8. The UE of claim 7, wherein the indication indicates a location of the subcarriers for the UL resource allocation.

9. The UE of claim 1, wherein the indication indicates a specific subcarrier for the UL resource allocation.

10. A base station, comprising:
a memory; and
a processor coupled to the memory, the processor configured to perform operations corresponding to:
transmitting downlink control information (DCI) carrying a downlink assignment for a narrowband physical downlink shared channel (NPDSCH), wherein the DCI includes an indication that indicates time domain resources and a frequency domain resource for transmission of hybrid automatic repeat request (HARQ) feedback on a narrowband physical uplink shared channel (NPUSCH); and
configuring operation to receive HARQ feedback on the NPUSCH using the indicated time domain resources and the frequency domain resource.

11. The base station of claim 10, wherein the indication indicates an offset between a last subframe of the NPDSCH and a first subframe for transmission of the HARQ feedback.

12. The base station of claim 10, wherein the indication indicates a starting time for transmission of the HARQ feedback.

13. The base station of claim 10, wherein the indication indicates time domain resources corresponding to a subframe location.

14. The base station of claim 10, wherein the indication indicates an offset between a last subframe of the NPDSCH and a starting time for transmission of the HARQ feedback.

15. The base station of claim 10, wherein the indication indicates an index of a first subframe for transmission of the HARQ feedback.

16. A baseband processor for a user equipment (UE), configured to perform operations corresponding to:
decoding an indication contained in received downlink control information (DCI) carrying a downlink assignment for a narrowband physical downlink shared channel (NPDSCH), wherein the indication indicates an offset between a last subframe of the NPDSCH and a starting time for transmission of hybrid automatic repeat request (HARQ) feedback on a narrowband physical uplink shared channel (NPUSCH);
determining an uplink (UL) resource allocation for HARQ feedback based on the indication; and
encoding the HARQ feedback for transmission on the NPUSCH using the determined UL resource allocation.

17. The baseband processor for the UE of claim 16, wherein the indication indicates an offset between a last subframe of the NPDSCH and a first subframe for transmission of the HARQ feedback.

18. The baseband processor for the UE of claim 16, wherein the indication indicates frequency domain resources for transmission of the HARQ feedback on the NPDSCH.

19. The baseband processor for the UE of claim 16, wherein the indication indicates an index of a first subframe for transmission of the HARQ feedback.

20. The baseband processor for the UE of claim 16, wherein the indication indicates a number of subcarriers for the UL resource allocation.

21. The baseband processor for the UE of claim 16, wherein the indication indicates a specific subcarrier for the UL resource allocation.

* * * * *